United States Patent
Hamilton et al.

(10) Patent No.: US 12,097,718 B2
(45) Date of Patent: Sep. 24, 2024

(54) PRINTED SUBSTRATE AND METHOD FOR PRINTING ONTO A SUBSTRATE

(71) Applicant: Ricoh Company, Ltd., Tokyo (JP)

(72) Inventors: John Hamilton, Shropshire (GB);
Andrew McVitie, Shropshire (GB);
Derek Smith, Shropshire (GB);
Samantha Davies, Shropshire (GB)

(73) Assignee: Ricoh Company, Ltd., Tokyo (JP)

( * ) Notice: Subject to any disclaimer, the term of this patent is extended or adjusted under 35 U.S.C. 154(b) by 586 days.

(21) Appl. No.: 17/274,319

(22) PCT Filed: Sep. 9, 2019

(86) PCT No.: PCT/JP2019/035314
§ 371 (c)(1),
(2) Date: Mar. 8, 2021

(87) PCT Pub. No.: WO2020/054646
PCT Pub. Date: Mar. 19, 2020

(65) Prior Publication Data
US 2021/0323332 A1    Oct. 21, 2021

(30) Foreign Application Priority Data
Sep. 10, 2018  (GB) .................................... 1814668

(51) Int. Cl.
*B41M 5/00* (2006.01)
*C09D 5/02* (2006.01)
*C09D 7/61* (2018.01)
*C09D 11/36* (2014.01)
*C09D 127/06* (2006.01)

(52) U.S. Cl.
CPC ........ *B41M 5/0011* (2013.01); *B41M 5/0047* (2013.01); *C09D 5/027* (2013.01); *C09D 5/028* (2013.01); *C09D 7/61* (2018.01); *C09D 11/36* (2013.01); *C09D 127/06* (2013.01)

(58) Field of Classification Search
CPC ....................................................... C09D 11/54
See application file for complete search history.

(56) References Cited

U.S. PATENT DOCUMENTS

| | | | |
|---|---|---|---|
| 5,460,874 A * | 10/1995 | Rao ...................... | B41M 5/5254 428/206 |
| 2002/0151615 A1* | 10/2002 | Tortorello ............ | C09D 11/101 522/96 |

(Continued)

FOREIGN PATENT DOCUMENTS

| EP | 2 580 067 A1 | 4/2013 |
|---|---|---|
| EP | 3 109 056 A1 | 12/2016 |

(Continued)

OTHER PUBLICATIONS

Korean Office Action dated Sep. 26, 2022, in Korean Application No. 10-2021-7006907, with English translation, 14 pages.

(Continued)

*Primary Examiner* — Shelby L Fidler
(74) *Attorney, Agent, or Firm* — Grüneberg and Myers PLLC (57) ABSTRACT

A method for printing onto a substrate is disclosed. An ink is printed onto a liquid polymer layer to form a printed polymer layer. Printed substrates are also disclosed.

20 Claims, 3 Drawing Sheets

(56) References Cited

U.S. PATENT DOCUMENTS

| | | |
|---|---|---|
| 2003/0064206 A1 | 4/2003 | Koyano et al. |
| 2010/0080910 A1 | 4/2010 | Okada |
| 2010/0277541 A1 | 11/2010 | Watanabe et al. |
| 2011/0303113 A1 | 12/2011 | Sarkisian et al. |
| 2011/0304661 A1* | 12/2011 | Emamjomeh .......... C09D 11/54 347/1 |
| 2013/0076842 A1 | 3/2013 | Sarkisian et al. |
| 2013/0156953 A1 | 6/2013 | Sarkisian et al. |
| 2013/0201264 A1 | 8/2013 | Terakado et al. |
| 2013/0249996 A1* | 9/2013 | Saito .................. C09D 11/54 347/21 |
| 2014/0308447 A1 | 10/2014 | Sarkisian et al. |
| 2015/0252205 A1* | 9/2015 | Sarkisian ............... C09D 11/54 524/104 |
| 2016/0023456 A1* | 1/2016 | Yoneyama ........... B41M 5/5281 347/20 |
| 2017/0210941 A1* | 7/2017 | Wakabayashi .......... C09D 11/54 |
| 2018/0207949 A1* | 7/2018 | Greger .................. B41J 2/2114 |
| 2019/0375222 A1* | 12/2019 | Hamilton ............. B41M 5/0017 |
| 2020/0010708 A1 | 1/2020 | Sugihara et al. |

FOREIGN PATENT DOCUMENTS

| | | |
|---|---|---|
| JP | 2002-79739 | 3/2002 |
| JP | 2003-94793 | 4/2003 |
| JP | 2009-234236 | 10/2009 |
| JP | 2010-155442 | 7/2010 |
| JP | 2013-158938 | 8/2013 |
| JP | 2013-538132 | 10/2013 |
| JP | 2014-97632 | 5/2014 |
| JP | 2017-19252 | 1/2017 |
| KR | 10-2010-0074231 | 7/2010 |
| WO | WO 2011/159274 A9 | 12/2011 |
| WO | WO 2011/159371 A1 | 12/2011 |
| WO | WO 2013/095332 A1 | 6/2013 |
| WO | WO 2014/051547 A1 | 4/2014 |
| WO | 2016/088847 | 6/2016 |
| WO | WO 2018/017307 A1 | 1/2018 |
| WO | WO 2018/110518 A1 | 6/2018 |
| WO | WO 2018/142726 A1 | 8/2018 |
| WO | WO 2018/168675 A1 | 9/2018 |

OTHER PUBLICATIONS

Search Report under Section 17 dated Mar. 26, 2019, issued to Application No. GB 1814668.8.

International Search Report and Written Opinion issued Nov. 25, 2019 in PCT/JP2019/035314 filed Sep. 9, 2019.

Japanese Office Action dated May 10, 2022, in Japanese Application No. 2021-512964, with English translation, 9 pages.

* cited by examiner

PRINTED SUBSTRATE AND METHOD FOR PRINTING ONTO A SUBSTRATE

TECHNICAL FIELD

The present invention relates to a printed substrate and to a method for printing onto a substrate.

BACKGROUND ART

Inkjet printing is used in a variety of printing applications, and can provide high resolution coloured images on a range of substrates. Advantageously, the inkjet printing process provides high quality durable images. The process should achieve high optical density such that the amount of ink required to achieve the desired image is minimised. Furthermore, the ink should adhere to the substrate such that the image is resistant to rubbing.

In recent years, inkjet printing has been used in the production of wallpaper. In addition to a printed pattern, wallpaper typically has a resin layer that provides scratch and stain resistance and that also affects the appearance of the wallpaper. WO 2018/110518 describes a printing method that can be used to prepare surface coverings such as wallpaper. In the disclosed method, a liquid resin layer is applied to a substrate and a pattern is applied to the liquid resin layer by inkjet printing. The liquid resin layer with the pattern then undergoes curing such that the liquid resin layer undergoes a phase transition from liquid to solid. In the examples, a liquid plastisol resin layer composition is applied to fleece-backed paper. The plastisol composition is a dispersion of polyvinyl chloride polymer in an ester-based plasticiser.

CITATION LIST

Patent Literature

[PTL 1] WO 2018/110518

SUMMARY OF INVENTION

Technical Problem

The present inventors have sought to make further improvements to printed substrates and to printing processes. In particular, the present inventors have sought to provide printed substrates having high quality durable images.

Solution to Problem

Accordingly, the present invention provides a method for printing onto a substrate, comprising steps of
  applying an aqueous polymer dispersion to a substrate to form a liquid aqueous polymer layer, wherein the aqueous polymer dispersion comprises water and polymer;
  printing an ink onto the liquid aqueous polymer layer to form a printed aqueous polymer layer, wherein the ink comprises a colorant and thereby the printed aqueous polymer layer comprises the colorant; and
  drying the printed aqueous polymer layer to change the printed aqueous polymer layer from liquid to solid.

The inventors have found that printing onto a liquid aqueous polymer layer can provide a substrate bearing a polymer layer and a high quality and durable printed image. In particular, the inventors have found that, provided that the aqueous layer is liquid when printing is carried out, the printing exhibits good dot spread and dot penetration. The printed layer is dried, such that water is evaporated from the layer and the polymer in the layer coalesces. The printed layer that results has high optical density and is resistant to rubbing.

Unlike the process of WO 2018/110518, wherein a polymer layer is formed using a polymer dispersed in a plasticiser followed by subsequent curing, the method of the present invention uses an aqueous polymer dispersion. The inventors have found that printing onto the liquid aqueous polymer layer can provide a printed layer with advantageous dot shape and uniformity of dot size and shape, leading to a high quality image. The printed image is durable, exhibiting effective resistance to rubbing. Furthermore, the method of the present invention benefits from the environmental advantages of using an aqueous-based component instead of the plasticiser-based components of the prior art.

The present invention further provides a printed substrate comprising a printed polymer layer on a substrate, wherein the printed polymer layer comprises a colorant and a polymer. Different substrates may be used, but preferred substrates have a surface made from wood, polymer (e.g. polyvinylchloride) or metal (e.g. aluminium). The printed substrate is obtainable by the method of the invention. The printed substrates differ from those typically obtained via the process of WO 2018/110518 in that they will not contain any plasticisers resulting from the plastisol resins, and in that the properties of the image differ due to the differing interaction of the ink and the liquid aqueous polymer layer as compared the interaction of the ink and the uncured plastisol layer. In the printed substrates of the invention, the polymer in the printed polymer layer may be advantageously chosen such that it adheres preferentially to the chosen substrate. Different polymers and blends of polymers will be preferred depending upon the type of substrate.

DESCRIPTION OF EMBODIMENTS

The method of the invention is for printing onto a substrate. The substrate may be formed of paper, non-woven fabric, plastic, wood, metal or combinations of these materials. Specific examples may be selected from natural paper, plastic film, synthetic paper, non-woven fabric, fleece, cloth, wood, semi-cure wallpaper (in which a solid resin layer is present in the form of a semi-gel), full-cure wallpaper, metal sheet, and metal thin film or any combination of these materials. In a preferred embodiment, the substrate comprises a fleece-backed paper. In another embodiment, the substrate is semi-rigid polyvinyl chloride which is suitably used for flooring applications. In yet another embodiment, the substrate is polyethylene, which is suitably used for packaging applications.

Multi-layered substrates may be used. Preferably the top layer of the substrate (onto which the aqueous polymer dispersion is applied) is selected from paper, plastic film (e.g. polyvinyl chloride), wood or metal (e.g. aluminium).

The method of the invention may comprise a further step, before the aqueous polymer dispersion is applied to a substrate, wherein the substrate is pre-treated. Such a pre-treatment step could include cleaning of the substrate (e.g. wiping with a cloth or by application of a cleaning liquid) or smoothing of the surface of the substrate (e.g. sanding with an abrasive material such as sandpaper). For example, a sheet metal substrate may be degreased, a polymer film substrate may be corona or plasma treated, and a wooden substrate may be cleaned to remove dust before the aqueous polymer dispersion is applied.

In the aqueous polymer dispersion a dispersed phase of polymer particles is present in an aqueous continuous phase. The continuous phase may comprise other components in addition to water.

The aqueous polymer dispersion suitably comprises at least 10 wt % water, based upon the weight of the aqueous polymer dispersion. Preferably the aqueous polymer dispersion comprises at least 20 wt % water, more preferably at least 30 wt % water and most preferably at least 40 wt % water, based upon the weight of the polymer dispersion. The continuous phase of the aqueous polymer dispersion preferably comprises at least 50 wt % water, more preferably at least 75% water and most preferably at least 95 wt % water, based upon the weight of the aqueous polymer dispersion minus the solid phase. It is preferred to maximise the water content of the continuous phase because water is readily removed and is environmentally benign.

The pH of the aqueous polymer dispersion is suitably between 4.0 and 9.0, more preferably between 6.0 and 7.5.

The aqueous polymer dispersion suitably comprises at least 10 wt % polymer, based upon the weight of the aqueous polymer dispersion. Preferably the aqueous polymer dispersion comprises at least 20 wt % polymer, more preferably at least 30 wt % polymer and most preferably at least 40 wt % polymer. Preferably the aqueous polymer dispersion comprises less than 80 wt % polymer, more preferably less than 70 wt % polymer. The dispersed phase of the aqueous polymer dispersion preferably comprises at least 90 wt % polymer, more preferably at least 95% polymer and most preferably at least 99 wt % water, based upon the solids content of the aqueous polymer dispersion. If the amount of polymer in the aqueous polymer dispersion is too low, this could lead to slow drying. The amount of polymer will also affect the viscosity of the aqueous polymer dispersion and the properties of the resulting liquid aqueous polymer layer.

The polymer particles that make up the dispersed phase in the aqueous polymer dispersion suitably have an average particle diameter of between 50 nm and 5000 nm, preferably between 100 nm and 2500 nm and more preferably between 100 nm and 1000 nm. A narrower particle size range is preferred as this is likely to improve the stability of the liquid aqueous polymer layer (i.e. reducing the likelihood of the layer separating into different phases). The average particle diameter (suitably a volume average) may be measured by techniques such as laser diffraction, dynamic light scatting and single particle optical sizing. The amount of polymer particles per litre of dispersion is suitably from $10^4$ to $10^9$ particles. This may be measured by single particle optical sizing.

The polymer in the dispersed phase is suitably a polymer derived from one or more of the following monomers: vinyl chloride, vinyl acetate, ethylene, styrene, acrylic acid, acrylates ($CH_2CHCOOR$ where R is suitably $C_{1-10}$ alkyl), methacrylic acid and methacrylates ($CH_2C(CH_3)COOR'$ where R' is suitably $C_{1-10}$ alkyl). Preferred polymers include polyvinylchloride (PVC), copolymers of vinyl chloride and vinyl acetate and terpolymers of vinyl chloride, vinyl acetate and ethylene. Vinyl-based polymers are typically inexpensive. Polymers including ethylene monomers benefit from internal plasticisation which is a property of the ethylene monomer units. This internal plasticisation avoids the use of liquid plasticisers, which may be costly and may migrate from the polymer layer.

Alternatively, the polymer in the dispersed phase is suitably an alkyd resin. An alkyd resin is a polyester formed by the polymerisation reaction between a polyhydric alcohol and a polyfunctional acid. Suitable polyhydric alcohols include glycerol, trimethylol ethane, trimethylol propane and pentaerythritol. Suitable polyfunctional acids include phthalic anhydride, isophthalic acid, fumaric acid and maleic anhydride. The characteristics of an alkyd resin are suitably controlled by adding vegetable oil to the polymerisation reaction. Alkyd resins have the advantages that they are stable, low cost and easy to modify to provide a range of hardnesses and drying times.

In an embodiment of the invention, the polymer in the dispersed phase may include monomers that are capable of cross-linking. Suitable monomers includes acrylamide, N-methylol acrylamide, acrylic acid and methacrylic acid. GB 2226564 describes photopolymerisable grafted polyvinyl alcohol resins, containing dispersed ethylenically unsaturated materials, that could be used as the polymer in the aqueous polymer dispersion of the present invention. A cross-linked polymer layer is likely to have improved durability.

Suitable aqueous polymer dispersions are readily available as commercial products. For example, Vilaqua™ resins are available from Vil Resins Ltd, and are dispersions of alkyd resins. Vinnol™ and Vinnapas™ resins are dispersions of polymers derived from co- and terpolymers of vinyl chloride, vinyl acetate and/or ethylene and are available from Wacker Chemie AG. Other suitable dispersions are Mowilith™ VC600 (a copolymer of vinyl acetate and vinyl chloride) and Revacryl™ 826 (an acrylic copolymer).

In an embodiment of the invention, the aqueous polymer dispersion is formed from a blend of two or more aqueous polymer dispersions. Blending two or more aqueous polymer dispersions enables the skilled person to optimise the properties of the liquid aqueous polymer layer that is formed. In particular, the skilled person can adjust the polymer properties according to the substrate that is used.

The viscosity of the aqueous polymer dispersion is suitably from 10 mPas to 2000 mPas, preferably from 20 mPas to 1500 mPas, more preferably from 40 mPas to 1000 mPas and most preferably from 100 mPas to 500 mPas. Viscosity is suitably measured using a Brookfield DV-III Ultra Programmable Rheometer. The viscosity of the aqueous polymer dispersion will affect the viscosity of the liquid aqueous polymer layer. The viscosity of the liquid aqueous polymer layer will affect the penetration of the ink into the polymer layer. If the viscosity of the liquid aqueous polymer layer is too low, then there may be insufficient spreading of ink on the polymer layer, leading to low optical density.

The surface tension of the aqueous polymer dispersion is suitably from 20-50 dyne/cm. This can be measured on a Drop Shape Analyser, e.g. any of the Drop Shape Analysers available from Kruss GmbH.

It may be advantageous to include additional components in the aqueous polymer dispersion. Suitable components could include surfactants, viscosity modifiers, fillers or crosslinking agents. Surfactants may act as wetting agents, levelling agents, dispersing agents, and defoaming agents.

Incorporating a surfactant in the aqueous polymer dispersion alters the surface tension of the liquid aqueous polymer layer that is formed. The surface tension affects how the ink penetrates the liquid aqueous polymer layer, so addition of a surfactant may improve the dot spread or dot penetration of the printing step. The surfactant may be a material based upon acetylenic diols, (e.g. Surfynol™ grades available from Evonik). These have optimum activity at solid/liquid interfaces, and may be particularly useful for giving optimum coating of the aqueous polymer dispersion to the substrate. The surfactant may also be a fluorocarbon surfactant such as those in the Capstone™ range from DuPont and materials from Omnova in the PolyFox™ range. This type of surfactant is particularly useful for giving optimum print coverage on the aqueous polymer dispersion surface. Other suitable surfactants include modified siloxanes available from BYK Chemie. Suitably, the surfactant is present in the aqueous polymer dispersion at from 0.005 to 2 wt %, based upon the weight of the aqueous polymer dispersion, preferably from 0.01 to 1.00 wt %. The amount of surfactant should be the minimum amount required to achieve the desired alteration of surface tension, thereby minimising cost.

Incorporating a viscosity modifier in the aqueous polymer dispersion would alter the viscosity of both the aqueous polymer dispersion and the liquid aqueous polymer layer that is formed. This could have beneficial consequences for the application of the aqueous polymer dispersion and also for the spreading of the ink on the liquid aqueous polymer layer. The viscosity modifier could be chosen from polyacrylic acid derivatives such as Junlon™, Aron™, Jurymer™ and Rheogic™ from Toagosei, and Carbopol™ from Lubrizol. Modifiers of this type impart viscosity to various types of system, allowing rheological adjustment and improving fluidity. Texipol™ inverse emulsion thickeners are versatile because they only impart viscosity effects after the inverse emulsion inverts directly in the system being thickened. Various polyhydric alcohols may also be used, such as glycerol, polyethylene glycol and polypropylene glycol. Suitably, the viscosity modifier is present in the aqueous polymer dispersion at from 0.05 to 15 wt %, based upon the weight of the aqueous polymer dispersion, preferably from 0.1 to 10 wt %. The amount of viscosity should be the minimum amount required to achieve the desired viscosity, thereby minimising cost.

Incorporating a filler in the aqueous polymer dispersion can achieve a variety of benefits. Fillers can impart improved mechanical properties to the polymer layer, or they can colour or opacify the polymer layer. Filler can also change the surface appearance of the dried polymer layer. Adding a filler may change the surface properties of the liquid aqueous polymer, which can lead to improved image properties, e.g. better dot spreading properties. Suitable fillers include calcium carbonate (ground and/or precipitated), talc (magnesium silicate), barytes (barium sulphate), mica (aluminium sulphate), alumina and other aluminium based minerals. Preferred fillers are calcium carbonate, talc, barytes and mica. Suitably, the filler is present in the aqueous polymer dispersion at from 1 wt % to 20 wt %, based upon the weight of the aqueous polymer dispersion, preferably from 2 wt % to 15 wt %. The filler is typically an inexpensive component of the aqueous polymer dispersion so there is no need to minimise the amount of filler.

Incorporating a cross-linking agent in the aqueous polymer dispersion could provide a polymer layer having improved durability, which could mean advantageous properties such as superior gloss, improved water resistance, improved resistance to weathering (UV and heat resistance) and improved rub resistance. A preferred cross-linking agent is a diisocyanate reagent.

The aqueous polymer dispersion is applied to the substrate to form a liquid aqueous polymer layer. The aqueous polymer layer is "liquid" in that the material of which the layer is formed can conform to the shape of its container. It is possible to test whether the material is a liquid or solid as follows. A 50 ml sample of the material is placed in an open topped container. The surface of the sample is deformed by picking a portion away by removing a 5 ml sample with a spatula. The sample is left for 6 hours. If the deformed part does not come back into the former state, it is a gel, if it does come back into the former state, it is a liquid.

To ensure that the aqueous polymer layer is liquid, it is necessary to carry out the printing soon after the aqueous polymer dispersion has been applied. If too much time elapses between the application of the aqueous polymer dispersion and the printing, then water may evaporate from the aqueous polymer layer such that it is no longer liquid. Preferably the time period between the application of the aqueous polymer dispersion and the printing is less than 4 hours, more preferably less than 1 hour and most preferably less than 10 minutes. If the method of the invention is carried out on a continuous manufacturing line, then the time period between the application of the aqueous polymer dispersion and the printing may suitably be less than 1 minute.

The aqueous polymer dispersion is applied by any suitable method. For example the dispersion could be applied by screen printing (flat-bed or rotary), roller coating with a metering roller or a doctor bar, gravure printing or coating line processes such as slot, extrusion, slide and curtain coating.

The thickness of the liquid aqueous polymer layer is suitably from 5 to 100 microns, preferably from 12 to 50 microns.

Suitably the printing is carried out by a droplet printing process, preferably inkjet printing. Any suitable inkjet printing apparatus could be used to print the printed aqueous polymer layer. For example, a RICOH Pro 4130 (trademark) wide format latex colour printer could be used. The inkjet print head is suitably heatable to control the viscosity of the inkjet inks. For example it may be heatable to a temperature in the range 30° C. to 60° C., most preferably around 45° C.

Preferably, at least two colours are printed. In accordance with normal inkjet printing techniques, a first colour ink is applied first and at least a second colour ink is applied subsequently. Full colour inkjet printing may be used. Conventional black, cyan, magenta and yellow printing heads may be used.

An oil-based ink is suitably used to print the printed aqueous polymer layer. The oil-based ink preferably comprises a carrier such as an oily component, and a colorant. The oil-based ink may optionally include a binder resin.

Preferably, the oily component is an ester oil. Suitable ester oils include phthalic acid esters such as dibutyl phthalate, dicapryl phthalate, diisodecyl phthalate, dioctyl phthalate (DPO), diisononyl phthalate, butyl-2-ethylhexyl phthalate, and di-2-ethylhexyl phthalate; adipic acid esters such as dioctyl adipate (diethylhexyl adipate: DOA) and diisononyl adipate (DINA); sebacic acid esters such as dibutyl sebacate, dioctyl sebacate, and diisononyl sebacate; citric acid esters such as acetyl tributyl citrate (ATBC); azelaic acid esters such as dibutyl azelate, dioctyl azelate, and diisononyl azelate; lauric acid esters such as methyl laurate, ethyl laurate, and isobutyl laurate; myristic acid esters such as isopropyl myristate, isocetyl myristate, and octyldodecyl myristate; palmitic acid esters such as isopropyl palmitate and octyl palmitate; octanoic acid esters such as cetyl octanoate, octyl octanoate (ethylhexyl ethylhexanoate: OOE), and isononyl octanoate; and isononanoic acid esters such as ethylhexyl isononanoate and isononyl isononanoate.

The viscosity of the oily component is preferably in the range from 5 mPas to 30 mPas, more preferably from 8 mPas to 18 mPas, most preferably from 10 mPas to 12 mPas at 45° C. Viscosity is preferably measured using a Brookfield DV-III Ultra Programmable Rheometer.

It is preferred that the oil-based ink comprises less than 1% by weight and more preferably less than 0.1% by weight of volatile organic compound solvent. A volatile organic compound solvent is as defined by the EU Directive 1999/13/EC (Solvent Emissions Directive), an organic compound having at 293.15 K a vapour pressure of 0.01 kPa or more.

Preferably, the oil-based ink is non-aqueous. Preferably, the content of water in the oil-based ink is less than 1% by weight, more preferably less than 0.1 weight percent, based upon the weight of the oil-based ink.

Specific examples of the colorant included in the oil-based ink include carbon black, pigments such as azo pigments, phthalocyanine pigments, nitroso pigments, nitro pigments, vat-dye pigments, mordant-dye pigments, basic-dye pigments, acid-dye pigments, and natural-dye pigments; and oil-soluble dyes such as diazo dyes and anthraquinone dyes. Each of these dyes and pigments can be used alone or in combination with others.

The printed aqueous polymer layer is dried. The drying could be carried out at ambient temperature, but suitably the printed aqueous polymer layer is heated to achieve evaporation of the water from the layer. During the drying step the printed aqueous polymer layer changes from a liquid to solid. The polymer particles from the dispersed phase coalesce to form a solid polymer layer. The drying is suitably carried out at a temperature in the range of 100° C. to 200° C. The duration of the drying step is suitably from 10 seconds to 10 minutes.

Further finishing steps may optionally be carried out after the drying step. Such finishing steps may include blowing, embossing, overcoating and/or laminating. The finishing steps may add decoration to the dried polymer layer, or may add extra protection.

Figure 1:
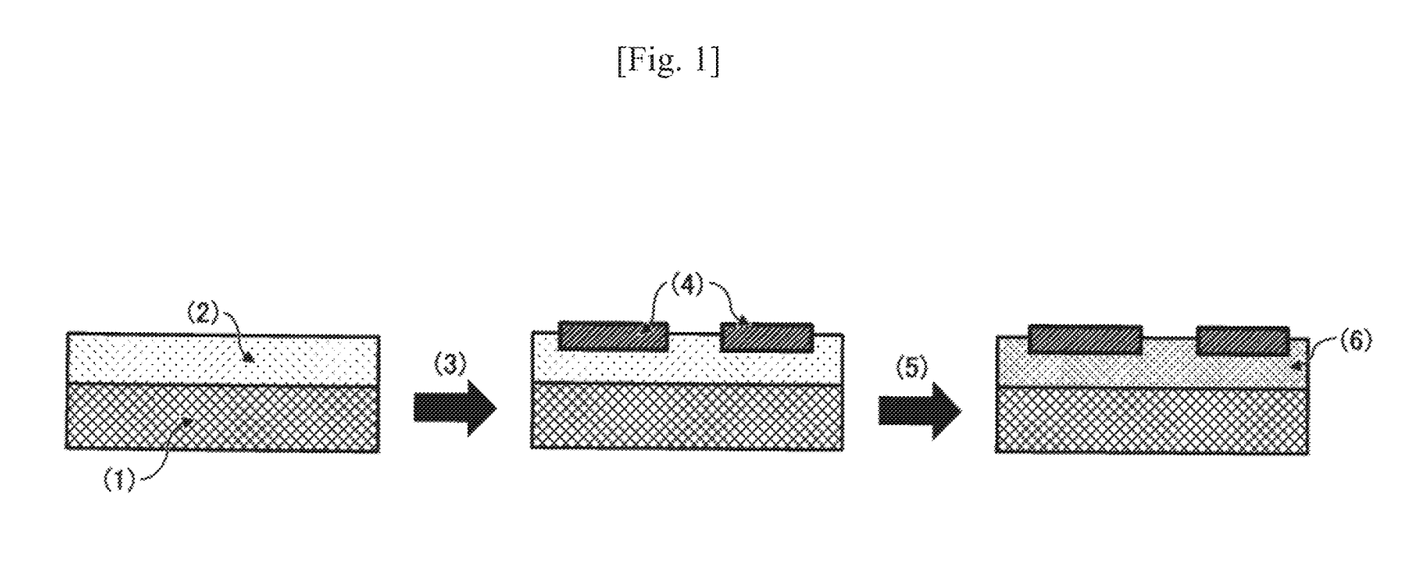
FIG. 1 schematically depicts an example method of printing onto a substrate of the present invention.

FIG. 1 schematically depicts an example of the method of the present invention. An aqueous polymer dispersion is applied to a substrate (1) to form a liquid aqueous polymer layer (2). A printed aqueous polymer layer (2, 4) is formed by printing (3) onto the liquid aqueous polymer layer (2). The printed aqueous polymer layer is heated (5) such that the water evaporates and the polymer coalesces, changing the aqueous polymer layer from a liquid to a solid polymer (6).

The invention further provides a printed substrate. The printed substrate is obtainable by the method according to the invention. The printed substrate comprises a printed polymer layer on a substrate. The printed polymer layer comprises a colorant. Suitable colorants are as described above. The printed layer comprise a polymer.

In one embodiment, the polymer in the printed polymer layer is suitably a polymer derived from one or more of the following monomers: vinyl chloride, vinyl acetate, ethylene, styrene, acrylic acid, acrylates ($CH_2CHCOOR$ where R is suitably $C_{1-10}$ alkyl), methacrylic acid and methacrylates ($CH_2C(CH_3)COOR'$ where R' is suitably $C_{1-10}$ alkyl). Preferred polymers include polyvinylchloride (PVC), copolymers of vinyl chloride and vinyl acetate, terpolymers of vinyl chloride, vinyl acetate and ethylene, and alkyd resins.

In a preferred embodiment, the polymer in the printed polymer layer comprises an alkyd resin (and suitably comprises at least 50 wt % of an alkyd resin, based upon the weight of polymer in the printed polymer layer).

The substrate is preferably chosen from a wooden substrate, a polymer substrate, a metal substrate or a cardboard or paper substrate. The polymer in the printed polymer layer may be advantageously chosen such that it adheres preferentially to the chosen substrate. Different polymers and blends of polymers will be preferred depending upon the material of the substrate.

Multi-layered substrates may be used. Preferably the top layer of the substrate (which is adjacent to the printed polymer layer) is selected from paper, plastic film (e.g. polyvinyl chloride), wood or metal (e.g. aluminium).

The printed polymer layer may comprise a surfactant. The surfactant may be a material based upon acetylenic diols, (e.g. Surfynol™ grades available from Evonik). The surfactant may also be a fluorocarbon surfactant such as those in the Capstone™ range from DuPont and materials from Omnova in the PolyFox™ range. Other suitable surfactants include modified siloxanes available from BYK Chemie. The surfactant is suitably present at between 0.01 wt % and 2 wt %, based upon the weight of the printed polymer layer.

The printed polymer layer may comprise a viscosity modifier. The viscosity modifier could be chosen from polyacrylic acid derivatives such as Junlon™, Aron™, Jurymer™ and Rheogic™ from Toagosei, and Carbopol™ from Lubrizol. Various polyhydric alcohol may also be used, such as glycerol, polyethylene glycol and polypropylene glycol. The viscosity modifier is suitably present at between 0.1 wt % and 5 wt % based upon the weight of the printed polymer layer.

The printed polymer layer may comprise a filler. Suitable fillers include calcium carbonate (ground and/or precipitated), talc (magnesium silicate), barytes (barium sulphate), mica (aluminium sulphate), alumina and other aluminium based minerals. Preferred fillers are calcium carbonate, talc, barytes and mica, most preferably ground calcium carbonate. The filler is suitably present at between 0.5 wt % and 10 wt %, based upon the weight of the printed polymer layer.

In one embodiment of the invention, the substrate is a wooden substrate. In a preferred embodiment, the substrate is a wooden substrate and the polymer in the printed layer comprises an alkyd resin polymer. More preferably the polymer in the printed layer comprises at least 50 wt % alkyd resin polymer, based upon the weight of polymer in the printed layer. In a further embodiment of the invention, the substrate is a polymer substrate, preferably a polyvinyl chloride substrate. In a preferred embodiment, the substrate is a polyvinyl chloride substrate and the polymer in the printed layer comprises a copolymer of polyvinyl chloride and vinyl acetate. More preferably the polymer in the printed layer comprises at least 50 wt % of a copolymer of polyvinyl chloride and vinyl acetate, based upon the weight of polymer in the printed layer.

In a further embodiment of the invention, the substrate is a metal substrate, preferably an aluminium substrate. In a preferred embodiment, the substrate is an aluminium substrate and the polymer in the printed layer comprises an alkyd resin polymer. More preferably the polymer in the printed layer comprises at least 50 wt % alkyd resin polymer, based upon the weight of polymer in the printed layer.

In a further embodiment of the invention, the substrate is a paper or cardboard substrate. In a preferred embodiment, the substrate is a paper or cardboard substrate and the polymer in the printed layer comprises a copolymer of polyvinyl chloride and vinyl acetate. More preferably the polymer in the printed layer comprises at least 50 wt % of a copolymer of polyvinyl chloride and vinyl acetate, based upon the weight of polymer in the printed layer.

The following non-limiting examples are illustrative of the invention.

Examples 1-26

In each example, an aqueous polymer dispersion was applied to a substrate. An ink was printed onto the liquid polymer layer. The printed layer was dried at 130° C. Table 1 shows the type of polymer dispersion that was used. The alkyd resin was Vilaqua™ 615A55 from Vil Resins Ltd. The vinyl chloride copolymer dispersion was Vinnol™ CE 35 from Wacker Chemie AG. Table 1 also indicates whether any additives were included in the aqueous polymer dispersion, the nature of the substrate and the colour of the ink. The optical density of the printed image and the durability are also recorded. The optical density was measured with an X-Rite 508 densitometer. The durability was assessed using a finger rub test. The durability was given a grade of 5 (excellent), 4 (very good), 3 (good), 2 (fair) or 1 (poor).

The printed images that were produced in these examples had good optical density. The inventors found that the ink drops had an even shape and uniform distribution. This is discussed further below for Examples 23, 25 and 26.

The examples demonstrate that different combinations of polymer dispersion and substrate give different image durability. Examples 1-3 show that the combination of a vinyl chloride copolymer dispersion with a brown paper board gives an image with very good durability. By contrast, Examples 4-6 show that combination of a vinyl chloride copolymer dispersion with a glass substrate gives an image with poor durability. Examples 7-10 demonstrate good durability for a combination of a vinyl chloride copolymer dispersion with an aluminium substrate. Examples 11-14 demonstrate reasonable durability for a combination of a vinyl chloride copolymer dispersion with a PVC substrate.

Example 17 shows that the best durability results for an alkyd resin dispersion including a fluorocarbon surfactant are with an aluminium substrate, whereas good results are obtained with a wooden substrate (Example 16) and reasonable results are obtained with a PVC substrate (Example 15).

A comparison of Example 18 with Examples 19-22 shows that image durability can be improved by incorporating an

TABLE 1

| | Polymer Dispersion | Additives | Substrate | Ink | Optical Density | Durability |
|---|---|---|---|---|---|---|
| Example 1 | Vinyl chloride copolymer | — | Brown paper board | Black | 1.94 | 5 |
| Example 2 | Vinyl chloride copolymer | — | Brown paper board | Cyan | 1.57 | 5 |
| Example 3 | Vinyl chloride copolymer | — | Brown paper board | Magenta | 1.60 | 5 |
| Example 4 | Vinyl chloride copolymer | — | Glass | Black | 0.66 | 1 |
| Example 5 | Vinyl chloride copolymer | — | Glass | Cyan | 0.35 | 1 |
| Example 6 | Vinyl chloride copolymer | — | Glass | Magenta | 0.54 | 1 |
| Example 7 | Vinyl chloride copolymer | — | Aluminium | Black | 1.46 | 4 |
| Example 8 | Vinyl chloride copolymer | — | Aluminium | Cyan | 1.40 | 4 |
| Example 9 | Vinyl chloride copolymer | — | Aluminium | Magenta | 1.25 | 4 |
| Example 10 | Vinyl chloride copolymer | — | Aluminium | Yellow | 1.15 | 4 |
| Example 11 | Vinyl chloride copolymer | — | PVC | Black | 0.84 | 3 |
| Example 12 | Vinyl chloride copolymer | — | PVC | Cyan | 1.67 | 3 |
| Example 13 | Vinyl chloride copolymer | — | PVC | Magenta | 2.32 | 3 |
| Example 14 | Vinyl chloride copolymer | — | PVC | Yellow | 1.35 | 3 |
| Example 15 | Alkyd resin | 0.08 wt % Polyfox 151N | PVC | Black | 1.26 | 3 |
| Example 16 | Alkyd resin | 0.08 wt % Polyfox 151N | Wood | Black | 1.81 | 4 |
| Example 17 | Alkyd resin | 0.08 wt % Polyfox 151N | Aluminium | Black | 1.07 | 5 |
| Example 18 | Alkyd resin | — | PVC | Black | 1.52 | 3 |
| Example 19 | Alkyd resin | 0.5 wt % Surfynol ™ 440 | PVC | Black | 2.5 | 4 |
| Example 20 | Alkyd resin | 0.5 wt % Surfynol ™ 440 | PVC | Cyan | 1.89 | 4 |
| Example 21 | Alkyd resin | 0.5 wt % Surfynol ™ 440 | PVC | Magenta | 1.13 | 4 |
| Example 22 | Alkyd resin | 0.5 wt % Surfynol ™ 440 | PVC | Yellow | 1.11 | 4 |
| Example 23 | Alkyd resin | — | PVC | Black | 1.41 | 3 |
| Example 24 | Alkyd resin | 5 wt % ground CaCO$_3$ | PVC | Black | 1.47 | 4 |
| Example 25 | Alkyd resin | 10 wt % ground CaCO$_3$ | PVC | Black | 1.18 | 4 |
| Example 26 | Alkyd resin 2 | 5 wt % precipitated CaCO$_3$ | PVC | Black | 1.47 | 3 |

All the polymer dispersions are aqueous, and thus the methods are environmentally advantageous when compared to the methods of the prior art that use plasticiser-based polymer systems.

acetylenic diol surfactant into the alkyd resin dispersion. A comparison of Examples 24 and 25 with Example 23 shows that image durability can be improved by incorporating ground calcium carbonate into the alkyd resin dispersion.

Comparative Example 1

The method of the Examples described above was repeated except that a plastisol dispersion (a dispersion of polyvinyl chloride polymer in an ester-based plasticiser) similar to those used in WO 2018/110518) was used instead of an aqueous alkyd resin dispersion.

Photomicrograph Images

Figure 2:
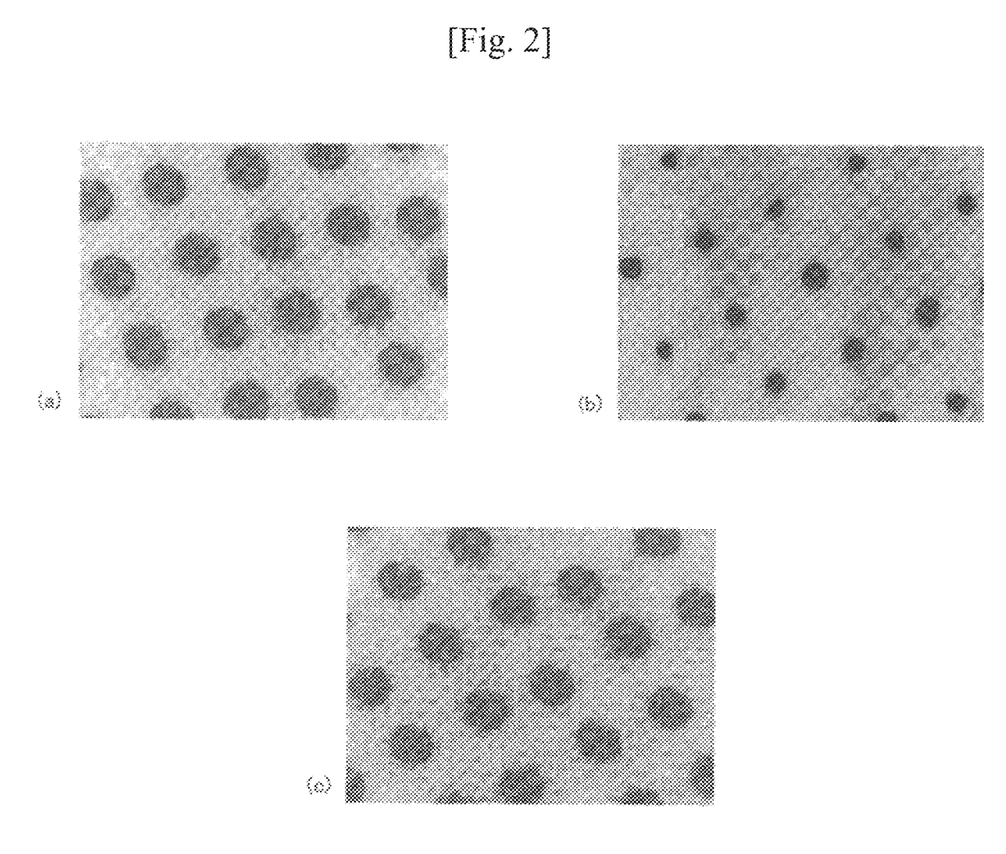
FIG. 2 is a photomicrograph of a printed substrate produced by a method according to the invention.

A photomicrograph of the image produced in Example 23 shown in FIG. 2a. The ink drops show even distribution. A photomicrograph of the image produced in Example 26 is shown in FIG. 2b. A photomicrograph of the image produced in Example 25 is shown in FIG. 2c.

Figure 3:
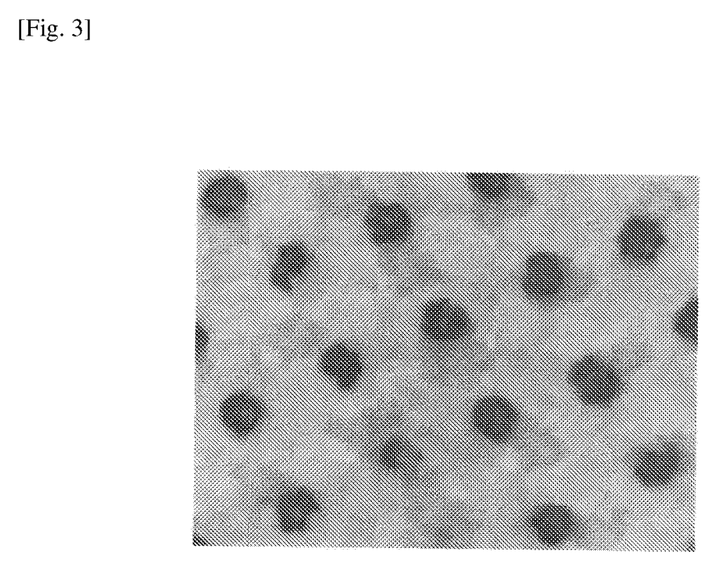
FIG. 3 is a photomicrograph of a printed substrate produced by a method according to the prior art.

The photomicrograph of the image produced in Comparative Example 1 is shown in FIG. 3. The ink drops show an uneven distribution, which will lead to poor colour strength and thus require the use of more ink.

Examples 27-34

Aqueous polymer dispersions were prepared as outlined in Tables 2A and 2B below. The alkyd resin dispersion was Vilaqua™ 615A55 from Vil Resins Ltd. The vinyl chloride copolymer dispersion was Vinnol™ CE 35 from Wacker Chemie AG. The vinyl acetate homopolyer dispersion was Emultex™ 581 from Synthomer. The wetting agent was Surfynol™ 440 from Evonik. The diisocyanate formulations 1, 2 and 3 were Desmodur™ DN, Desmodur™ 2860 and Bayhydur™ 3100, all from Covestro.

TABLE 2A

| | Example 27 | Example 28 | Example 29 | Example 30 |
|---|---|---|---|---|
| Alkyd resin dispersion (g) | | 40 | 30 | 30 |
| Vinyl chloride copolymer dispersion (g) | | | 10 | 10 |
| Vinyl acetate homopolymer dispersion (g) | 40 | 10 | 10 | 10 |
| Wetting agent (g) | 0.4 | 0.4 | 0.4 | 0.4 |
| Diisocyanate formulation 1 (g) | 10 | | | |
| Viscosity (mPas) | 100,000 | 100,000 | 16,200 | 7,800 |
| % Solids | 32.4 | 43.6 | 37.8 | 37.8 |

TABLE 2B

| | Example 31 | Example 32 | Example 33 | Example 34 |
|---|---|---|---|---|
| Alkyd resin dispersion (g) | 30 | 30 | 30 | 30 |
| Vinyl chloride copolymer dispersion (g) | 5 | 5 | 5 | 10 |
| Vinyl acetate homopolymer dispersion (g) | 10 | 10 | 10 | 10 |
| Wetting agent (g) | 0.4 | 0.4 | 0.4 | 0.4 |
| Diisocyanate formulation 1 (g) | 10 | | | |
| Diisocyanate formulation 2 (g) | | 10 | | |
| Diisocyanate formulation 3 (g) | | | 10 | |
| Water | | | | 15 |
| Viscosity (mPas) | 27,000 | 26,880 | 49,206 | 66 |
| % Solids | 50 | 28 | 36.8 | 34.1 |

Each aqueous polymer dispersion was applied to a PVC substrate. An ink was printed onto the liquid polymer layer. The printed layer was dried at 130° C. The results of the printing are shown in Table 3:

TABLE 3

| | Dot appearance | Optical density | Primer adhesion | Ink adhesion (rank 1 is poor; rank 5 is excellent) |
|---|---|---|---|---|
| Example 27 | — | 0.74 | Soft (good after curing) | 4 |
| Example 28 | Pigment concentrated at the centre of the drop | 2.08 | Soft, scrapes off | 2 |
| Example 29 | Pigment concentrated at the edges of the drop | 1.42 | Hard, good | 2 |
| Example 30 | Even | 1.5 | Hard, good | 3 |
| Example 31 | Pigment concentrated at the edges of the drop | 1.2 | Hard, good | 4 |
| Example 32 | Even | 0.93 | Hard, good | 4 |
| Example 33 | Even | 1.23 | Hard, good | 5 |
| Example 34 | Uneven shape | 1.26 | Hard, good | 4 |

The present application is based on and claims priority of United Kingdom Patent Application No. 1814668.8 filed on Sep. 10, 2018, the entire contents of which are hereby incorporated herein by reference.

The invention claimed is:

1. A method for printing onto a substrate, comprising:
applying an aqueous polymer dispersion to a substrate to form a liquid aqueous polymer layer, wherein the aqueous polymer dispersion comprises water and polymer;
printing an oil-based ink onto the liquid aqueous polymer layer to form a printed aqueous polymer layer, wherein the oil-based ink comprises a colorant and thereby the printed aqueous polymer layer comprises the colorant; and
drying the printed aqueous polymer layer to change the printed aqueous polymer layer from liquid to solid,
wherein the polymer is a copolymer of vinyl chloride and vinyl acetate or a terpolymer of vinyl chloride, vinyl acetate, and ethylene; and
wherein the substrate is an aluminium substrate or a cardboard substrate.

2. The method according to claim 1, wherein the substrate is an aluminium substrate.

3. The method according to claim 1, wherein the aqueous polymer dispersion further comprises a surfactant.

4. The method according to claim 3, wherein the surfactant is one or more surfactants chosen from acetylenic diols, fluorocarbon surfactants and modified siloxanes.

5. The method according to claim 1, wherein the aqueous polymer dispersion comprises a viscosity modifier.

6. The method according to claim 5, wherein the viscosity modifier is one or more viscosity modifiers chosen from polyacrylic acid derivatives and polyhydric alcohols.

7. The method according to claim 1, wherein the aqueous polymer dispersion comprises a filler chosen from calcium carbonate, talc, barytes and mica.

8. The method according to claim 7, wherein the filler is ground calcium carbonate.

9. The method according to claim 1, wherein the aqueous polymer dispersion comprises at least 30 wt % polymer and less than 80 wt % polymer, based upon the weight of the aqueous polymer dispersion.

10. The method according to claim 1, wherein the substrate is a cardboard substrate.

11. The method according to claim 1, wherein the polymer is a terpolymer of vinyl chloride, vinyl acetate, and ethylene.

12. The method according to claim 1, wherein the oil-based ink comprises less than 1% by weight of water.

13. A printed substrate comprising a printed polymer layer on a substrate, wherein the printed polymer layer comprises an oil-based ink comprising a colorant and a polymer, wherein the polymer is a copolymer of vinyl chloride and vinyl acetate or a terpolymer of vinyl chloride, vinyl acetate, and ethylene; and wherein the substrate is an aluminium substrate or a cardboard substrate.

14. The printed substrate according to claim 13, wherein the substrate is an aluminium substrate.

15. The printed substrate according to claim 13, wherein the printed polymer layer comprises a surfactant chosen from acetylenic diols, fluorocarbon surfactants and modified siloxanes.

16. The printed substrate according to claim 13, wherein the printed polymer layer comprises a viscosity modifier chosen from polyacrylic acid derivatives and polyhydric alcohols.

17. The printed substrate according to claim 13, wherein the printed polymer layer comprises a filler chosen from calcium carbonate, talc, barytes and mica.

18. The printed substrate according to claim 17, wherein the filler is ground calcium carbonate.

19. The printed substrate according to claim 13, wherein the substrate is a cardboard substrate.

20. The printed substrate according to claim 13, wherein the polymer is a terpolymer of vinyl chloride, vinyl acetate, and ethylene.

* * * * *